(No Model.) 2 Sheets—Sheet 1.
F. COOK.
CARRIER FOR FEEDING BAGASSE FURNACES.
No. 449,464. Patented Mar. 31, 1891.
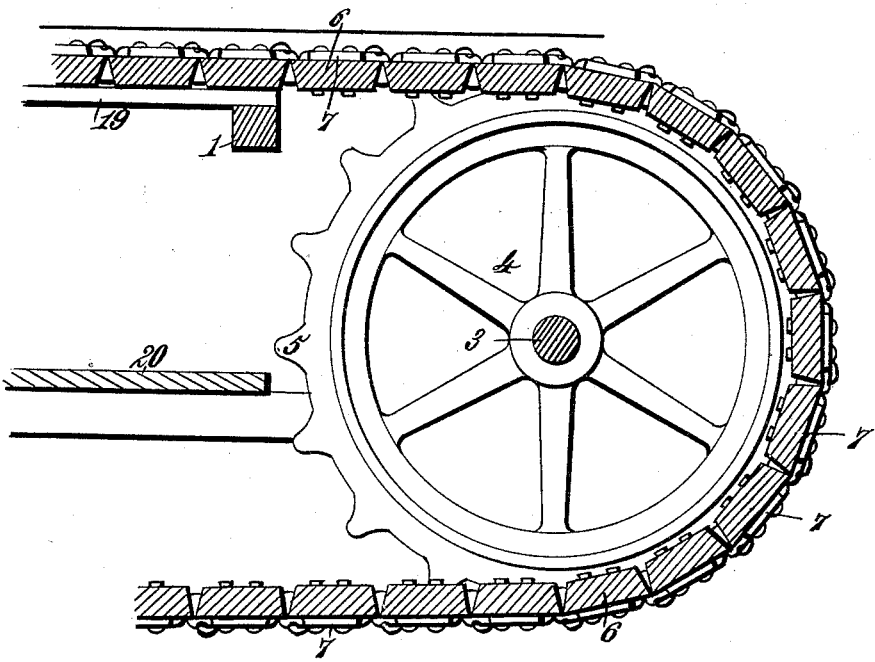
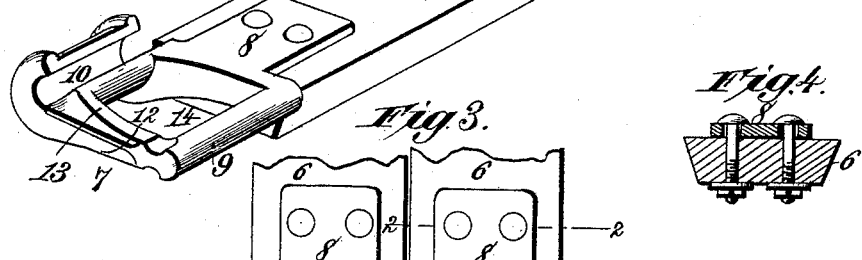
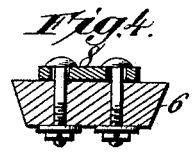
Witnesses:
Inventor:
Frederic Cook.
By James L. Norris.
Atty.

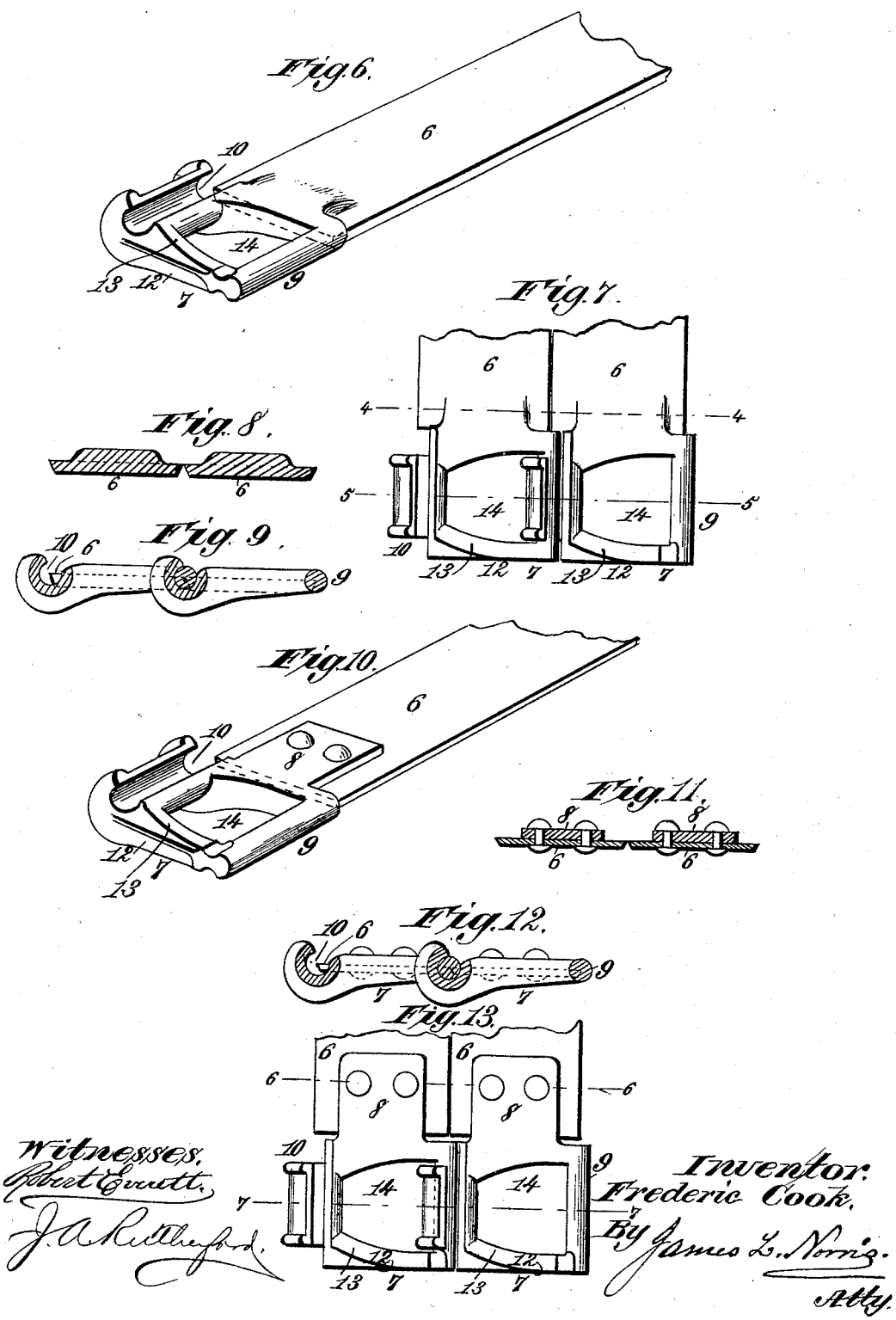

UNITED STATES PATENT OFFICE.

FREDERIC COOK, OF NEW ORLEANS, LOUISIANA.

CARRIER FOR FEEDING BAGASSE-FURNACES.

SPECIFICATION forming part of Letters Patent No. 449,464, dated March 31, 1891.

Application filed September 17, 1890. Serial No. 365,209. (No model.)

*To all whom it may concern:*

Be it known that I, FREDERIC COOK, a citizen of the United States, residing at New Orleans, in the parish of Orleans and State of Louisiana, have invented new and useful Improvements in Carriers for Feeding Bagasse-Furnaces, of which the following is a specification.

My invention relates to certain improvements in continuous carriers for feeding bagasse-furnaces and other uses, and the purposes thereof are to provide, first, a simple construction whereby a carrier shall at all times present a continuous plane surface, and free from openings between the slats, or so nearly so as to prevent the smaller pieces of material or particles of bagasse from escaping through the slats, either when the carrier is straight or when it is passing over the drums or sprocket-wheels, whereby I avoid the danger of this fine bagasse being caught by the wind after passing through the slatted carrier and blown over the sugar-house and machinery, besides collecting in large quantities upon the slack side of the carrier.

To this end my invention consists in the novel features of construction of parts, hereinafter more fully set forth, and then pointed out definitely in the claim following this specification.

To enable others skilled in the art to understand and practice my invention, I will now describe the same in detail, reference being had to the accompanying drawings, in which—

Figure 1 is a detail sectional view of sufficient of a carrier to illustrate my invention. Fig. 2 is a detail perspective of part of one of the slats of the carrier, showing one of the sprocket-castings on one end. Fig. 3 is a plan view of one end of two of the slats, showing the sprocket-castings connected. Fig. 4 is a transverse section on the line 2 2, Fig. 3. Fig. 5 is a transverse section upon the line 3 3 of Fig. 3. Fig. 6 is a detail perspective showing an all-metal slat or strip having the sprocket-link cast upon the end thereof. Fig. 7 is a plan view of two connected slats or strips of the kind shown in Fig. 6, having the sprocket-castings connected together. Fig. 8 is a transverse vertical section upon the line 4 4 in Fig. 7. Fig. 9 is a similar section upon the line 5 5 in Fig. 7. Fig. 10 is a detail perspective of one end of an all-metal slat, having the sprocket-link riveted or bolted to its end. Fig. 11 is a transverse vertical section taken upon the line 6 6 in Fig. 13. Fig. 12 is a similar section taken upon the line 7 7 in Fig. 13. Fig. 13 is a plan view of one end of two of the slats shown in Figs. 10, 11, and 12 connected together.

In the said drawings, the reference-numeral 1 indicates a portion of the frame-work upon which the carrier is supported. Upon this frame-work I mount one or more shafts 3, upon which are rigidly mounted sprocket-wheels 4, having teeth 5, which engage sprocket-castings upon the ends of the slats of the carrier. The sprockets are positively driven from any suitable source of power, and they impart movement to the carrier, which has the construction about to be described.

The carrier is composed of a series of similar slats or strips 6, of wood or other suitable material, each slat having upon its ends sprocket-castings 7. These castings, which are formed of suitable metal, consist of lugs 8, lying upon the slat and bolted thereto. Projecting beyond the ends of the slat are the open castings, integral with the lugs 8 and each composed of a pintle 9, having its axis substantially in the line of the upper edge of the slat, and a socket 10, which projects in rear of the other edge of the slat, where it is adapted to receive the pintle of the casting upon the adjacent slat, which is slipped longitudinally into place by turning the slat through about one-fourth a revolution. The pintle 9 and socket 10 are connected upon one side by the lug 8 and upon the other by a bar 12, having a rib 13, which is parallel with the end of the slat and by which the rectilinear movement is insured.

Between the lug 8 and bar 12 and between the pintle and socket is an opening 14 for the tooth of the sprocket-wheel.

To give a perfectly-true adjustment of the slats in the upper part of the carrier, I may place slide-bars 19 beneath the slats, as shown in Fig. 1, whereby the weight of the upper or loaded portion of the carrier will be sustained.

Each of the slats forming the carrier is arranged to present a plane surface with the adjacent slat, beveled upon its longitudinal edges, as shown in Figs. 3 and 4, the angle of the bevel being substantially determined by the radius of the sprocket-wheels driving the carrier, whereby the slats may not only pass easily and naturally around the wheel without separation of their outer or contacting edges, but may also maintain said outer edges in contact throughout their entire travel of said carrier, as to prevent any escape or leakage of the finer portions of the bagasse through the carrier. In other words, the slats are so beveled and the sockets and pintles connecting them are so arranged that the outer angles are always the center of radial movement and are therefore always in contact. This result may be effected by giving to the slats other forms beside that shown in Fig. 4, as, for example, by slightly rounding the beveled edges or by concaving said edges. I prefer, however, to use the construction shown by which a close surface is preserved throughout the whole extent of the carrier.

Between the upper and lower portions of the slatted carrier I may interpose a tight flooring 20, formed of wood or other suitable material and having support upon the uprights of the carrier-frame. This flooring is intended to catch the drippings from the bagasse, if there be any.

By this invention the carrier is maintained in a tightly-closed condition, not only when traveling between the drums or sprockets but when passing over the latter, thereby effectually preventing the escape of fine bagasse and avoiding all the inconveniences and injurious effects resulting therefrom.

I may construct the slats or strips 6 of metal instead of wood, in which case I may cast the sprocket-link 7 upon each end, as shown in Fig. 6. In this form of construction, also, the slat may be and will necessarily be made much thinner; but will still preserve the essential features of the invention, to wit: a plane continuous surface, whereby the edges of the slats are at all times preserved in close contact both in passing over the drum and traversing the carrier-way.

My invention also contemplates the use of an all-metal slat or strip having the sprocket-link riveted or bolted to it, as shown in Figs. 10, 11, 12, and 13; but inasmuch as these changes involve merely the formal change of constructing the sprocket-link separately and attaching it to the slat no further specific description is necessary.

It will be understood, of course, that the axis of the socket-piece 10 bears the same relation to the acute edge of the slat adjacent thereto as the axis of the pintle 9 bears to the opposite and similar edge.

What is claimed is—

A carrier in the form of an endless apron composed of a series of transverse slats having their ends connected to sprocket-links, so that their longitudinal edges abut to form a continuous plane surface, said abutting edges being acutely beveled, as described, to maintain close contact in passing over and between the sprocket-drums, substantially as described.

In testimony whereof I have affixed my signature in presence of two witnesses.

FREDERIC COOK.

Witnesses:
JAMES A. RUTHERFORD,
J. G. MEYERS, Jr.